United States Patent
Okubo et al.

(10) Patent No.: US 8,743,728 B2
(45) Date of Patent: Jun. 3, 2014

(54) RADIO BASE STATION AND MOBILE COMMUNICATION METHOD

(75) Inventors: Naoto Okubo, Yokosuka (JP); Hiroyuki Ishii, Yokohama (JP); Sadayuki Abeta, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 208 days.

(21) Appl. No.: 13/496,058

(22) PCT Filed: Sep. 13, 2010

(86) PCT No.: PCT/JP2010/065724
§ 371 (c)(1),
(2), (4) Date: May 2, 2012

(87) PCT Pub. No.: WO2011/034021
PCT Pub. Date: Mar. 24, 2011

(65) Prior Publication Data
US 2012/0207054 A1 Aug. 16, 2012

(30) Foreign Application Priority Data
Sep. 15, 2009 (JP) ............................... P2009-213668

(51) Int. Cl.
| | |
|---|---|
| *H04L 12/26* | (2006.01) |
| *H04W 4/00* | (2009.01) |
| *H04L 12/56* | (2006.01) |
| *H04W 72/04* | (2009.01) |
| *H04W 28/04* | (2009.01) |

(52) U.S. Cl.
CPC ............. *H04L 47/10* (2013.01); *H04W 72/042* (2013.01); *H04W 28/04* (2013.01)
USPC .............................. 370/252; 370/318; 370/329

(58) Field of Classification Search
CPC ......... H04L 1/00; H04L 1/0026; H04L 43/50; H04L 47/10; H04L 5/0007; H04W 72/08; H04W 28/04; H04W 72/042; H04W 72/0413
USPC ........................... 370/236–329; 455/450, 550
See application file for complete search history.

(56) References Cited

U.S. PATENT DOCUMENTS

| | | | |
|---|---|---|---|
| 7,444,169 B2 * | 10/2008 | Ishii et al. ...................... | 455/561 |
| 7,583,968 B2 * | 9/2009 | Kimura .......................... | 455/450 |

(Continued)

FOREIGN PATENT DOCUMENTS

| | | |
|---|---|---|
| JP | 2005-086304 A | 3/2005 |
| JP | 2005-318470 A | 11/2005 |

OTHER PUBLICATIONS

3GPP TS 36.213 V8.7.0, May 2009, "3rd Generation Partnership Project; Technical Specification Group Radio Access Network; Evolved Universal Terrestrial Radio Access (E-UTRA); Physical layer procedures (Release 8)," pp. 25-33, 10 pages.

(Continued)

*Primary Examiner* — Afsar M Qureshi
(74) *Attorney, Agent, or Firm* — Osha Liang LLP

(57) ABSTRACT

A radio base station eNB according to the present invention includes: a CQI reception unit 11 configured to receive CQI in PDSCH from a mobile station UE; a CQI adjustment unit 13 configured to adjust the received CQI based on a transmission acknowledgement result for a downlink data signal transmitted via the PDSCH; a selectable TF number calculation unit 22 configured to calculate a selectable maximum transport block size based on the number of mobile stations UE in each scheduling unit period; and an MCS selection unit 15 configured to select a modulation scheme and a coding rate, which are to be applied to each resource blocks in the PDSCH, based on the adjusted CQI and a transmission format corresponding to the calculated selectable maximum transport block size.

16 Claims, 13 Drawing Sheets

(56) References Cited

U.S. PATENT DOCUMENTS

| | | | |
|---|---|---|---|
| 8,068,427 B2* | 11/2011 | Gholmieh et al. | 370/236 |
| 8,275,408 B2* | 9/2012 | Attar et al. | 455/522 |
| 8,280,392 B2* | 10/2012 | Iwamura et al. | 455/452.1 |
| 8,358,630 B2* | 1/2013 | Kim et al. | 370/332 |
| 8,488,520 B2* | 7/2013 | Awad et al. | 370/328 |
| 8,576,771 B2* | 11/2013 | Awad et al. | 370/328 |
| 2012/0051248 A1* | 3/2012 | Roh et al. | 370/252 |

OTHER PUBLICATIONS

3GPP TS 36.213 V10.4.0, Dec. 2011, "3rd Generation Partnership Project; Technical Specification Group Radio Access Network; Evolved Universal Terrestrial Radio Access (E-UTRA); Physical layer procedures (Release 10)," 124 pages.

International Search Report issued in PCT/JP2010/065724, mailed on Oct. 19, 2010, with translation, 4 pages.

* cited by examiner

FIG. 3

| $N_{PRB}$ / $I_{TBS}$ | 1 | 2 | 3 | ... | 108 | 109 | 110 |
|---|---|---|---|---|---|---|---|
| 0 | 16 | 32 | 56 | ... | | | |
| 1 | 24 | 56 | 88 | ... | | | |
| 2 | 32 | 72 | 144 | ... | | | |
| ... | ... | ... | ... | | ... | ... | ... |
| 24 | 584 | 1192 | 1800 | ... | 66592 | 66592 | 66592 |
| 25 | 616 | 1256 | 1864 | ... | 68808 | 68808 | 71112 |
| 26 | 712 | 1480 | 2216 | ... | 75376 | 75376 | 75376 |

RADIO BASE STATION AND MOBILE COMMUNICATION METHOD

CROSS REFERENCE TO RELATED APPLICATIONS

The present application is a U.S. National Stage of PCT International Application No. PCT/JP2010/065724, filed on Sep. 13, 2010, and claims foreign priority to Japanese Patent Application No. 2009-213668, filed on Sep. 15, 2009.

TECHNICAL FIELD

The present invention relates to a radio base station and a mobile communication method.

BACKGROUND ART

In an LTE (Long Term Evolution) mobile communication system defined in 3GPP, a logical peak rate (or peak throughput) in uplink and downlink is determined by a TBS (Transport Block Size) table.

In the TBS table, usable TBS is defined in each number of resource blocks. Furthermore, there are 27 types of MCS (Modulation and Coding Scheme) to be applicable to each resource blocks, that is, 27 types of a transmission format (TF).

Here, in the mobile communication system, a case where a maximum TBS defined in the above-mentioned TBS table is selected corresponds to a case where a peak rate is achieved.

However, in the above-mentioned LTE mobile communication system, throughput characteristics when a transmission format (TF #26) corresponding to the maximum TBS has been used may be degraded in an actual radio environment, that is, a peak rate determined by the maximum TBS defined in the TBS table may not be achieved.

SUMMARY OF THE INVENTION

Therefore, the present invention has been achieved in view of the above-described problems, and an object thereof is to provide a radio base station and a mobile communication method, by which it is possible to realize a high speed peak rate without degrading throughput characteristics.

A first characteristic of the present invention is summarized as A radio base station configured to transmit a downlink data signal to a mobile station via a downlink data channel, the radio base station comprising, a channel quality information reception unit configured to receive channel quality information in the downlink data channel from the mobile station, a channel quality information adjustment unit configured to adjust the received channel quality information based on a transmission acknowledgement result for the downlink data signal transmitted via the downlink data channel, a selectable transport format number calculation unit configured to calculate a selectable maximum transport block size based on the number of mobile stations in each scheduling unit period, and a selection unit configured to select a modulation scheme and a coding rate, which are to be applied to each resource blocks in the downlink data channel, based on the adjusted channel quality information and a transmission format corresponding to the calculated selectable maximum transport block size.

A second characteristic of the present invention is summarized as a radio base station configured to transmit a downlink data signal to a mobile station via a downlink data channel, the radio base station comprising, a channel quality information reception unit configured to receive channel quality information in the downlink data channel from the mobile station, a channel quality information adjustment unit configured to adjust the received channel quality information based on a transmission acknowledgement result for the downlink data signal transmitted via the downlink data channel, a selection unit configured to acquire a transmission format corresponding to a selectable maximum transport block size as an external setting parameter, and select a modulation scheme and a coding rate, which are to be applied to each resource blocks in the downlink data channel, based on the adjusted channel quality information and the acquired transmission format corresponding to the selectable maximum transport block size.

A third characteristic of the present invention is summarized as a radio base station configured to transmit a downlink data signal to a mobile station via a downlink data channel, the radio base station comprising, a channel quality information reception unit configured to receive channel quality information in the downlink data channel from the mobile station, a channel quality information adjustment unit configured to adjust the received channel quality information based on a transmission acknowledgement result for the downlink data signal transmitted via the downlink data channel, a measurement unit configured to measure an error rate in the downlink data channel, a calculation unit configured to calculate a transmission format corresponding to a selectable maximum transport block size based on the measured error rate in the downlink data channel, and a selection unit configured to select a modulation scheme and a coding rate, which are to be applied to each resource blocks in the downlink data channel, based on the adjusted channel quality information and the calculated transmission format corresponding to the selectable maximum transport block size.

A fourth characteristic of the present invention is summarized as a mobile communication method, in which a downlink data signal is transmitted from a radio base station to a mobile station via a downlink data channel, the mobile communication method comprising, a step in which the mobile station transmits channel quality information in the downlink data channel to the radio base station, a step in which the radio base station adjusts the received channel quality information based on a transmission acknowledgement result for the downlink data signal transmitted via the downlink data channel, a step in which the radio base station calculates a selectable maximum transport block size based on the number of mobile stations in each scheduling unit period, and a step in which the radio base station selects a modulation scheme and a coding rate, which are to be applied to each resource blocks in the downlink data channel, based on the adjusted channel quality information and a transmission format corresponding to the calculated selectable maximum transport block size.

A fifth characteristic of the present invention is summarized as a mobile communication method, in which a downlink data signal is transmitted from a radio base station to a mobile station via a downlink data channel, the mobile communication method comprising, a step in which the mobile station transmits channel quality information in the downlink data channel to the radio base station, a step in which the radio base station adjusts the received channel quality information based on a transmission acknowledgement result for the downlink data signal transmitted via the downlink data channel, a step of inputting a transmission format corresponding to a selectable maximum transport block size to the radio base station as an external setting parameter, and a step in which the radio base station selects a modulation scheme and a coding rate, which are to be applied to each resource blocks in the downlink data channel, based on the adjusted channel quality information and the input transmission format corresponding to the selectable maximum transport block size.

A sixth characteristic of the present invention is summarized as a mobile communication method, in which a downlink data signal is transmitted from a radio base station to a mobile station via a downlink data channel, the mobile communication method comprising, a step in which the mobile station transmits channel quality information in the downlink data channel to the radio base station, a step in which the radio base station adjusts the received channel quality information based on a transmission acknowledgement result for the downlink data signal transmitted via the downlink data channel, a step of measuring an error rate in the downlink data channel, a step of calculating a transmission format corresponding to a selectable maximum transport block size based on the measured error rate in the downlink data channel, and a step in which the radio base station selects a modulation scheme and a coding rate, which are to be applied to each resource blocks in the downlink data channel, based on the adjusted channel quality information and the calculated transmission format corresponding to the selectable maximum transport block size.

A seventh characteristic of the present invention is summarized as a radio base station configured to receive an uplink data signal from a mobile station via an uplink data channel, the radio base station comprising, a quality calculation unit configured to calculate a quality in the uplink data channel, a quality adjustment unit configured to adjust the calculated quality in the uplink data channel based on a reception result for the uplink data signal transmitted via the uplink data channel, a selectable transport format number calculation unit configured to calculate a selectable maximum transport block size based on the number of mobile stations in each scheduling unit period, and a selection unit configured to select a modulation scheme and a coding rate, which are to be applied to each resource blocks in the uplink data channel, based on the adjusted quality in the uplink data channel and a transmission format corresponding to the determined selectable maximum transport block size.

A eighth characteristic of the present invention is summarized as a radio base station configured to receive an uplink data signal from a mobile station via an uplink data channel, the radio base station comprising, a quality calculation unit configured to calculate a quality in the uplink data channel, a quality adjustment unit configured to adjust the calculated quality in the uplink data channel based on a reception result for the uplink data signal transmitted via the uplink data channel, a selection unit configured to acquire a transmission format corresponding to a selectable maximum transport block size as an external setting parameter, and select a modulation scheme and a coding rate, which are to be applied to each resource blocks in the uplink data channel, based on the adjusted quality in the uplink data channel and the acquired transmission format corresponding to the selectable maximum transport block size.

A ninth characteristic of the present invention is summarized as a radio base station configured to receive an uplink data signal from a mobile station via an uplink data channel, the radio base station comprising, a quality calculation unit configured to calculate a quality in the uplink data channel, a quality adjustment unit configured to adjust the calculated quality in the uplink data channel based on a reception result for the uplink data signal transmitted via the uplink data channel, a measurement unit configured to measure an error rate in the uplink data channel, a calculation unit configured to calculate a transmission format corresponding to a selectable maximum transport block size based on the measured error rate in the uplink data channel, and a selection unit configured to select a modulation scheme and a coding rate, which are to be applied to each resource blocks in the uplink data channel, based on the adjusted quality in the uplink data channel and the calculated transmission format corresponding to the selectable maximum transport block size.

A tenth characteristic of the present invention is summarized as A mobile communication method, in which an uplink data signal is transmitted from a mobile station to a radio base station via an uplink data channel, the mobile communication method comprising, a step of calculating a quality in the uplink data channel, a step in which the radio base station adjusts the calculated quality in the uplink data channel based on a reception result for the uplink data signal transmitted via the uplink data channel, a step in which the radio base station calculates a selectable maximum transport block size based on the number of mobile stations in each scheduling unit period, and a step in which the radio base station selects a modulation scheme and a coding rate, which are to be applied to each resource blocks in the uplink data channel, based on the adjusted quality in the uplink data channel and a transmission format corresponding to the calculated selectable maximum transport block size.

A eleventh characteristic of the present invention is summarized as a mobile communication method, in which an uplink data signal is transmitted from a mobile station to a radio base station via an uplink data channel, the mobile communication method comprising, a step of calculating a quality in the uplink data channel, a step in which the radio base station adjusts the calculated quality in the uplink data channel based on a reception result for the uplink data signal transmitted via the uplink data channel, a step of inputting a transmission format corresponding to a selectable maximum transport block size to the radio base station as an external setting parameter; and a step in which the radio base station selects a modulation scheme and a coding rate, which are to be applied to each resource blocks in the uplink data channel, based on the adjusted quality in the uplink data channel and the input transmission format corresponding to the selectable maximum transport block size.

A twelve characteristic of the present invention is summarized as a mobile communication method, in which an uplink data signal is transmitted from a mobile station to a radio base station via an uplink data channel, the mobile communication method comprising, a step of calculating a quality in the uplink data channel, a step in which the radio base station adjusts the calculated quality in the uplink data channel based on a reception result for the uplink data signal transmitted via the uplink data channel, a step of measuring an error rate in the uplink data channel, a step of calculating a transmission format corresponding to a selectable maximum transport block size based on the measured error rate in the uplink data channel, and a step in which the radio base station selects a modulation scheme and a coding rate, which are to be applied to each resource blocks in the uplink data channel, based on the adjusted quality in the uplink data channel and the calculated transmission format corresponding to the selectable maximum transport block size.

BRIEF DESCRIPTION OF THE DRAWINGS

FIG. 3 is a diagram illustrating an example of a TBS table used in the mobile communication system according to the first embodiment of the present invention.

DETAILED DESCRIPTION (Mobile Communication System According to First Embodiment of the Present Invention)

With reference to FIG. 1 to FIG. 4, a mobile communication system according to a first embodiment of the present invention will be described.

Figure 1:
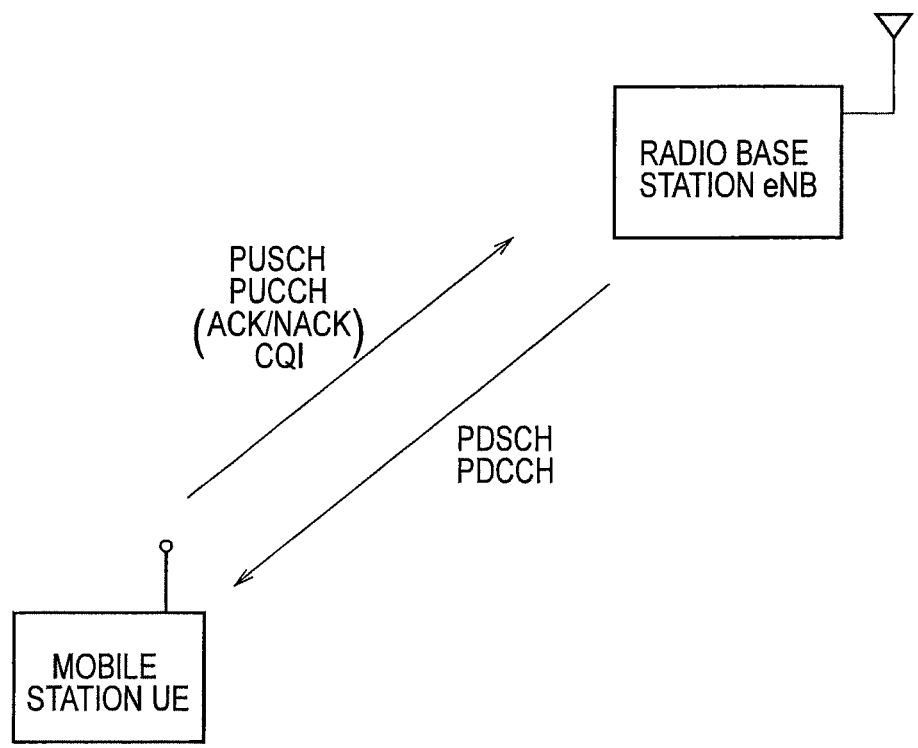
FIG. 1 is a diagram illustrating the entire configuration of a mobile communication system according to a first embodiment of the present invention.

The mobile communication system according to the present embodiment is an LTE mobile communication system. As illustrated in FIG. 1, in the mobile communication system according to the present embodiment, a radio base station eNB is configured to transmit a downlink data signal to a mobile station UE via PDSCH (Physical Downlink Shared Channel, a downlink data channel), and transmit a downlink control signal to the mobile station UE via PDCCH (Physical Downlink Control Channel, a downlink control channel).

Furthermore, in the mobile communication system, the mobile station UE is configured to transmit an uplink data signal to the radio base station eNB via PUSCH (Physical Uplink Shared Channel, an uplink data channel), and transmit an uplink control signal to the radio base station eNB via PUCCH (Physical Uplink Control Channel, an uplink control channel).

Here, the mobile station UE is configured to transmit, as the uplink control signal, an "ACK/NACK", which represents transmission acknowledgement information indicating a transmission acknowledgement result for the downlink data signal transmitted via the PDSCH, or CQI (Channel Quality Indicator, channel quality information) in the PDSCH.

Figure 2:
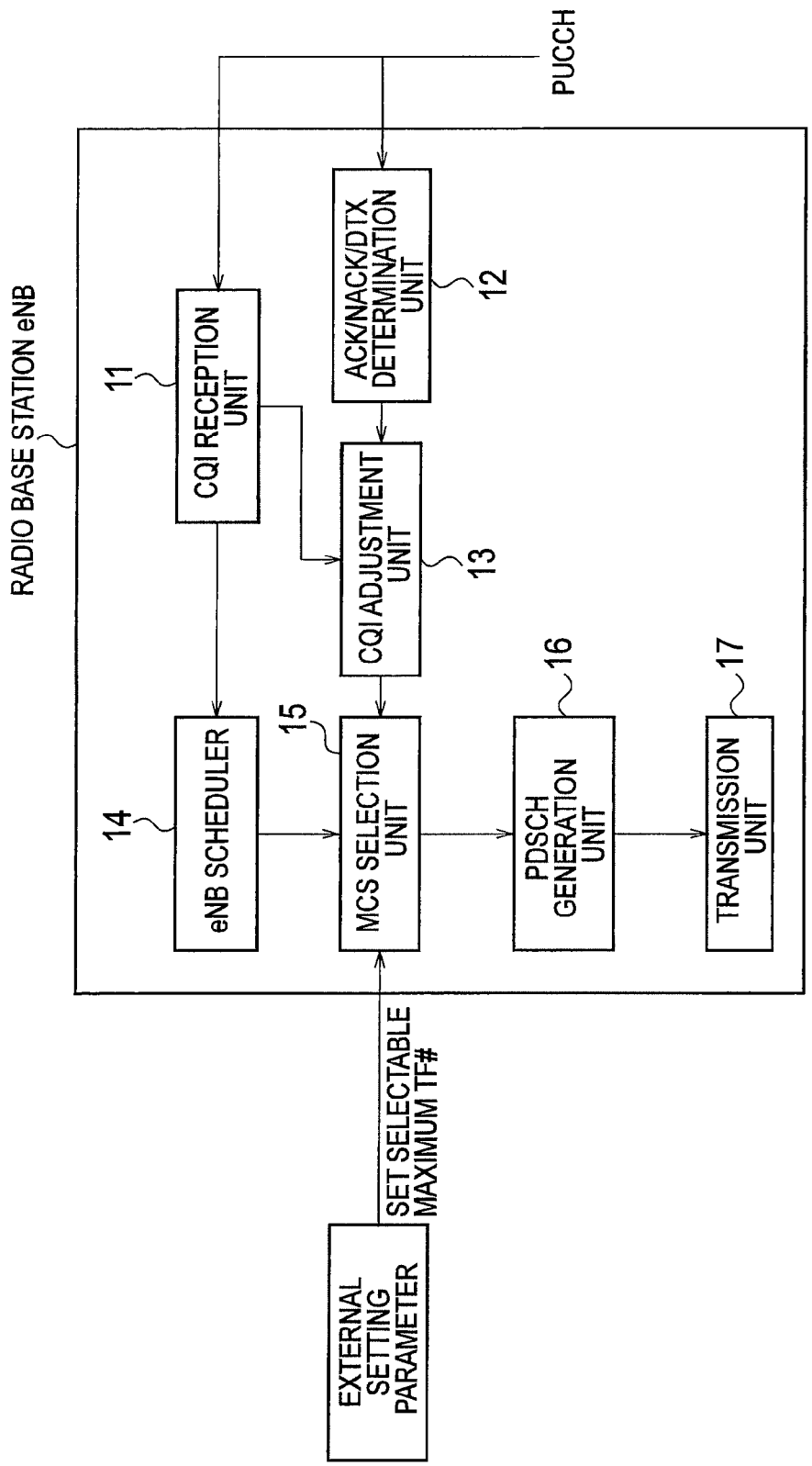
FIG. 2 is a functional block diagram of a radio base station according to the first embodiment of the present invention.

As illustrated in FIG. 2, the radio base station eNB includes a CQI reception unit 11, an ACK/NACK/DTX determination unit 12, a CQI adjustment unit 13, an eNB scheduler 14, an MCS selection unit 15, a PDSCH generation unit 16, and a transmission unit 17.

The CQI reception unit 11 is configured to receive the CQI in the PDSCH, which has been transmitted by the mobile station UE via the PUCCH.

The ACK/NACK/DTX determination unit 12 is configured to determine the transmission acknowledgement result (ACK/NACK/DTX) for the downlink data signal, which has been transmitted to the mobile station UE via the PDSCH, based on the transmission acknowledgement information transmitted by the mobile station UE via the PUCCH.

The CQI adjustment unit 13 is configured to adjust the CQI by adding an offset amount to the CQI received in the CQI reception unit 11, based on the transmission acknowledgement result (ACK/NACK/DTX) for the above-mentioned downlink data signal, which has been determined by the ACK/NACK/DTX determination unit 12.

Specifically, the CQI adjustment unit 13 is configured to adjust the CQI received in the CQI reception unit 11 by Equation 1 below.

$$CQI \text{adjust} = CQI \text{received} + CQI \text{offset} \quad \text{[Equation 1]}$$

In Equation 1 above, the CQIadjust indicates the CQI adjusted by the CQI adjustment unit 13, the CQIreceived indicates the CQI received in the CQI reception unit 11, and the CQIoffset indicates an offset amount given by Equation 2 below.

$$CQI \text{ offset} = \begin{cases} CQI \text{ offset} + \Delta_{adj} \times BLER_{target} & \text{Input} = \text{``ACK''} \\ CQI \text{ offset} - \Delta_{adj} \times (1 - BLER_{target}) & \text{Input} = \text{``NACK''} \\ CQI \text{ offset} & \text{Input} = \text{``DTX''} \end{cases} \quad \text{[Equation 2]}$$

In Equation 2 above, the BLERtarget is a parameter indicating a target BLER (Block Error Rate) in the PDSCH, and the Δadj is a parameter indicating a CQI adjustment width.

According to Equation 1 and Equation 2, when the ACK/NACK/DTX determination unit 12 has determined that the transmission acknowledgement result for the above-mentioned downlink data signal is "ACK", the CQI adjustment unit 13 is configured to increment the CQI offset amount by "Δadj×BLERtarget".

Furthermore, according to Equation 1 and Equation 2, when the ACK/NACK/DTX determination unit 12 has determined that the transmission acknowledgement result for the above-mentioned downlink data signal is "NACK", the CQI adjustment unit 13 is configured to decrement the CQI offset amount by "Δadj×(1-BLERtarget)".

Furthermore, according to Equation 1 and Equation 2, when the ACK/NACK/DTX determination unit 12 has determined that the transmission acknowledgement result for the above-mentioned downlink data signal is "DTX", the CQI adjustment unit 13 is configured to not change the CQI offset amount.

The eNB scheduler 14 is configured to perform scheduling in the PDSCH and scheduling in the PUSCH.

Specifically, the eNB scheduler 14 is configured to determine a mobile station UE, to which a downlink data signal is to be transmitted, and a radio resource (for example, resource blocks in the PDSCH) for transmitting the downlink data signal.

Furthermore, the eNB scheduler 14 is configured to determine a mobile station UE, which can transmit an uplink data signal, and a radio resource (for example, resource blocks in the PUSCH) for transmitting the uplink data signal.

The MCS selection unit 15 is configured to select MCS (a combination of a modulation scheme and a coding rate) to be applied to each resource blocks in the PDSCH, that is, a transmission format, based on the CQI adjusted by the CQI adjustment unit 13 and transmission formats (that is, selectable maximum TFs) corresponding to a selectable maximum transport block size.

For example, the MCS selection unit 15 may be configured to select a transmission format, which corresponds to the CQI adjusted by the CQI adjustment unit 13, from the transmission formats corresponding to the selectable maximum transport block size.

Here, the MCS selection unit 15 is configured to acquire the number (that is, a selectable maximum TF #) of the transmission format corresponding to the selectable maximum transport block size, as an external setting parameter.

FIG. 3 illustrates a "TBS table" defined in "Table 7.1.7.2.1-1" of TS 36.213 of 3GPP. Here, an "ITBS" indicates a TBS index corresponding to TF #, a "NPRB" indicates the number of resource blocks, and numerals in the table indicate transport block sizes.

For example, the MCS selection unit 15 is configured to acquire "TF #25", "TF #26" and the like as the number (that is, the selectable maximum TF #) of the transmission format corresponding to the selectable maximum transport block size.

Figure 4:
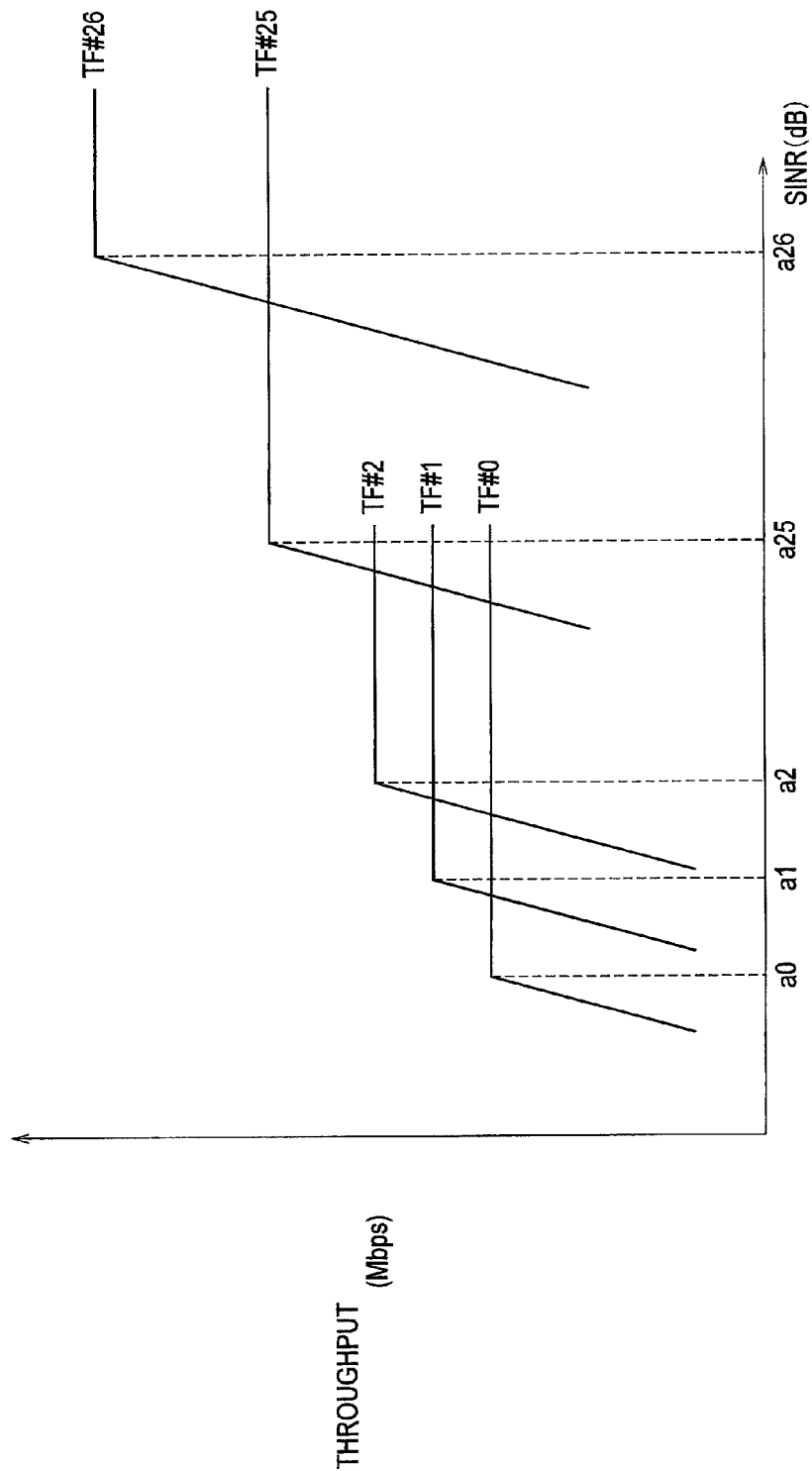
FIG. 4 is a diagram illustrating an example of throughput characteristics in the mobile communication system according to the first embodiment of the present invention.

In addition, FIG. 4 illustrates a relation between a SINR and throughput when transmission formats TF #0 to TF #26 are used.

In general, the LTE mobile communication system is configured such that a coding rate applied in the PDSCH is increased as a TBS (TF #) applied in the PDSCH is large, and therefore, configured such that the required power in the PDSCH is increased.

That is, the LTE mobile communication system is configured such that a coding rate applied in the PDSCH is decreased as a TBS (TF #) applied in the PDSCH is small, and therefore, configured such that the required power in the PDSCH is decreased.

Here, the LTE mobile communication system is configured such that there is a large difference occurs between a coding rate in TF #25 and a coding rate in TF #26. Therefore, even in a radio environment (a SINR state) in which communication is not possible at the coding rate in TF #26, if an ACK is continuously received in the state where the TF #25 is used, since the radio base station eNB increases the CQI offset amount by the CQI adjustment unit, the TF #26 is selected and a failure necessarily occurs in the transmission of a downlink data signal, resulting in a problem of the degradation in throughput.

In such a radio environment, it is preferable that the "TF #25" is input to the radio base station eNB as the number of the transmission format corresponding to the selectable maximum transport block size.

Meanwhile, in a radio environment (a SINR state) in which communication is possible at the coding rate in TF #26, in order to improve throughput, it is preferable that the "TF #26" is input to the radio base station eNB as the number of the transmission format corresponding to the selectable maximum transport block size.

The PDSCH generation unit 16 is configured to generate a downlink data signal, which is to be transmitted via the PDSCH, based on the MCS (the transmission format) selected by the MCS selection unit 15.

The transmission unit 17 is configured to transmit the downlink data signal generated by the PDSCH generation unit 16 to the scheduled mobile station UE via the PDSCH.

Next, with reference to FIG. 5, an operation of the radio base station eNB according to the present embodiment will be described.

Figure 5:
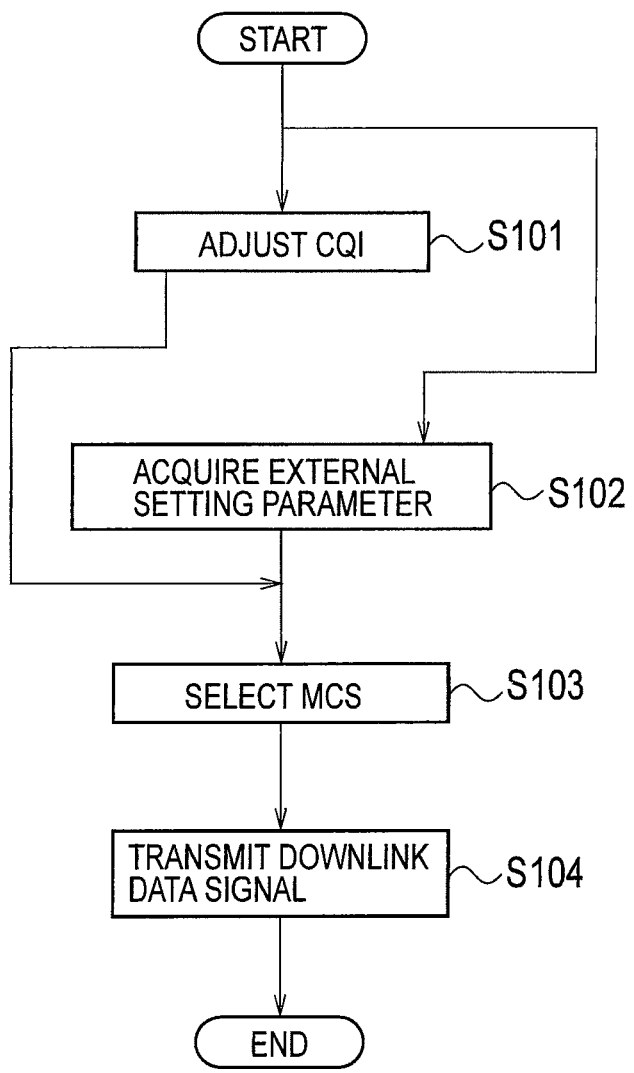
FIG. 5 is a flowchart illustrating an operation of the radio base station according to the first embodiment of the present invention.

As illustrated in FIG. 5, in step S101, the radio base station eNB adjusts CQI, which is received from the mobile station UE via the PUCCH, based on the transmission acknowledgement result (ACK/NACK/DTX) for the downlink data signal transmitted via the PDSCH.

In step S102, the radio base station eNB acquires the number (that is, the selectable maximum TF #) of the transmission format corresponding to the selectable maximum transport block size, as the external setting parameter.

In step S103, the radio base station eNB selects MCS (a transmission format) based on the adjusted CQI and the transmission format corresponding to the selectable maximum transport block size.

In step S104, the radio base station eNB transmits a downlink data signal, which is addressed to the scheduled mobile station UE, by using the selected MCS (transmission format) via the PDSCH.

In accordance with the mobile communication system according to the present embodiment, through simple control with a small development impact, it is possible to avoid the degradation of throughput characteristics due to the use of MCS (a transmission format) with a high coding rate in which reception characteristics are degraded in a specific radio environment.

First Modification

Figure 6:
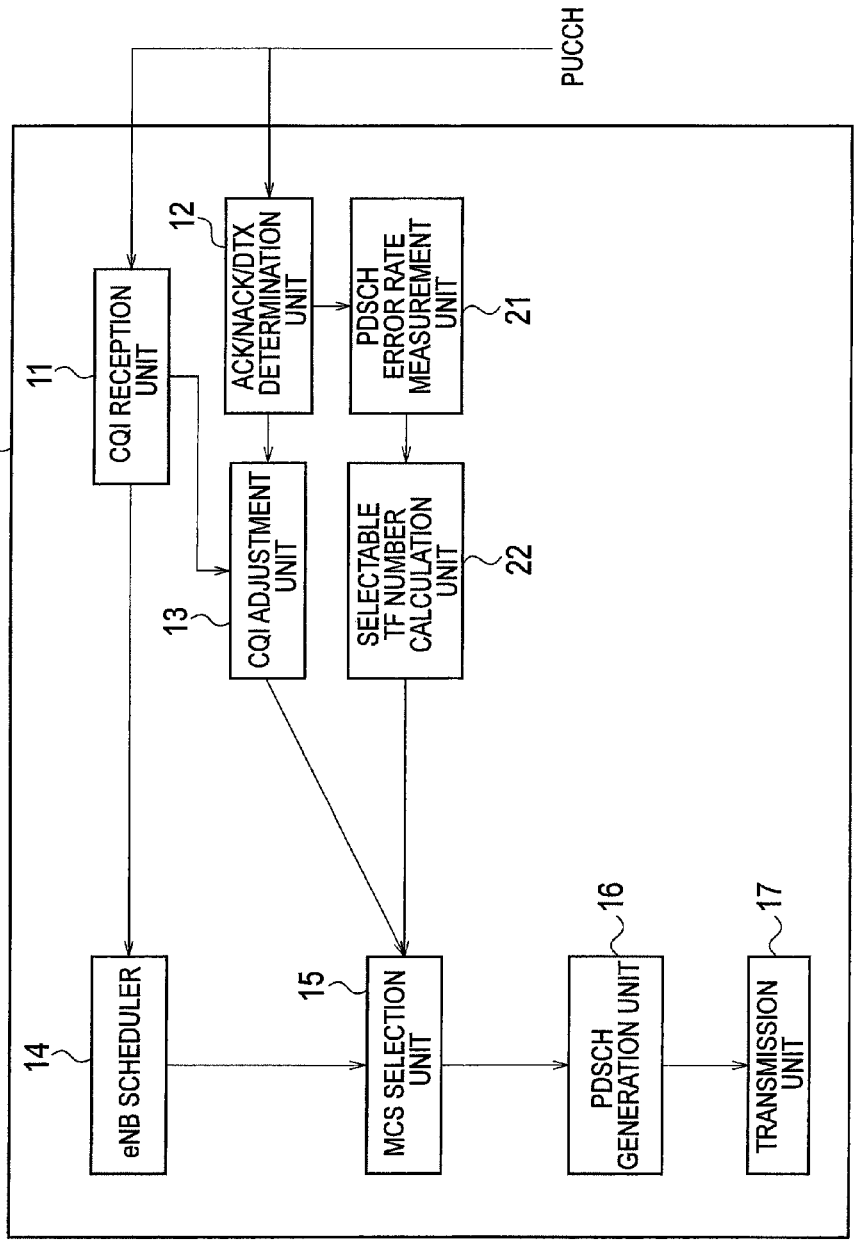
FIG. 6 is a functional block diagram of the radio base station according to a first modification of the first embodiment of the present invention.
Figure 7:
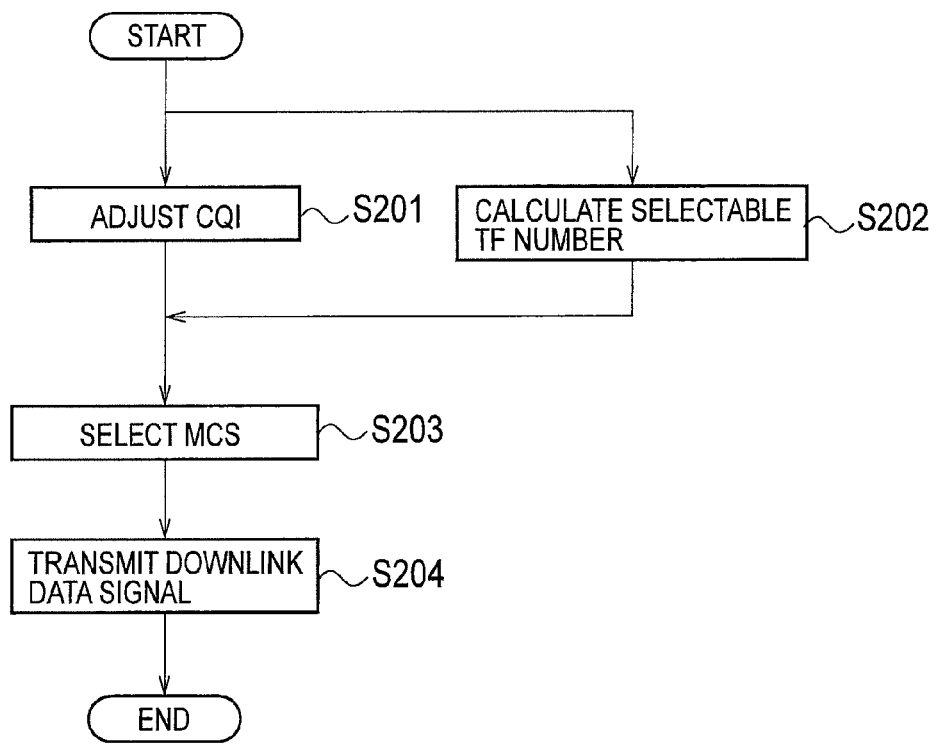
FIG. 7 is a flowchart illustrating an operation of the radio base station according to the first modification of the first embodiment of the present invention.

With reference to FIG. 6 and FIG. 7, a mobile communication system according to a first modification of the first embodiment of the present invention will be described. Hereinafter, the mobile communication system according to the present first modification will be described while focusing on the difference from the above-mentioned mobile communication system according to the first embodiment.

As illustrated in FIG. 6, a radio base station eNB according to the present first modification includes a PDSCH error rate measurement unit 21 and a selectable TF number calculation unit 22, in addition to the configuration of the radio base station eNB according to the above-mentioned first embodiment.

The PDSCH error rate measurement unit 21 is configured to measure an index (a metric value) indicating reception quality in the PDSCH, such as BLER (an error rate) in the PDSCH, based on the transmission acknowledgement result (ACK/NACK/DTX) for the above-mentioned downlink data signal, which has been determined by the ACK/NACK/DTX determination unit 12.

For example, the PDSCH error rate measurement unit 21 may be configured to measure, as the metric value, BLER for upper Z MCSs within a measurement interval Y second in each measurement cycle X second.

The selectable TF number calculation unit 22 is configured to calculate the transmission format (that is, the selectable maximum TF) corresponding to the selectable maximum transport block size, based on the metric value, such as the BLER in the PDSCH, which has been measured by the PDSCH error rate measurement unit 21.

For example, the selectable TF number calculation unit 22 may determine a transmission format (for example, a transmission format specified by the TF #26), in which the above-mentioned metric value is equal to or more than a predetermined threshold value, to be non-selectable.

Here, the selectable TF number calculation unit 22 may determine the transmission format, in which the above-mentioned metric value is equal to or more than the predetermined threshold value, to be non-selectable until a next measurement interval ends.

The MCS selection unit 15 is configured to select MCS (a combination of a modulation scheme and a coding rate) to be applied to each resource blocks in the PDSCH, that is, a transmission format, based on the CQI adjusted by the CQI adjustment unit 13 and a transmission format (that is, a selectable maximum TF) corresponding to the selectable maximum transport block size calculated by the selectable TF number calculation unit 22.

Next, with reference to FIG. 7, an operation of the radio base station eNB according to the present first modification will be described.

As illustrated in FIG. 7, in step S201, the radio base station eNB adjusts the CQI, which is received from the mobile station UE via the PUCCH, based on the transmission acknowledgement result (ACK/NACK/DTX) for the downlink data signal transmitted via the PDSCH.

In step S202, the radio base station eNB calculates the number (that is, the selectable maximum TF #) of the transmission format corresponding to the selectable maximum transport block size based on the measured BLER in the PDSCH.

In step S203, the radio base station eNB selects MCS (a transmission format) based on the adjusted CQI and the calculated transmission format corresponding to the selectable maximum transport block size.

In step S204, the radio base station eNB transmits a downlink data signal, which is addressed to a scheduled mobile station UE, by using the selected MCS (transmission format) via the PDSCH.

In accordance with the mobile communication system according to the present first modification, it is possible to avoid the use of MCS in which communication is not possible with respect to a mobile station UE in an environment with bad reception quality or a mobile station UE with bad decoding performance, resulting in the avoidance of the degradation of throughput characteristics.

Second Modification

Figure 8:
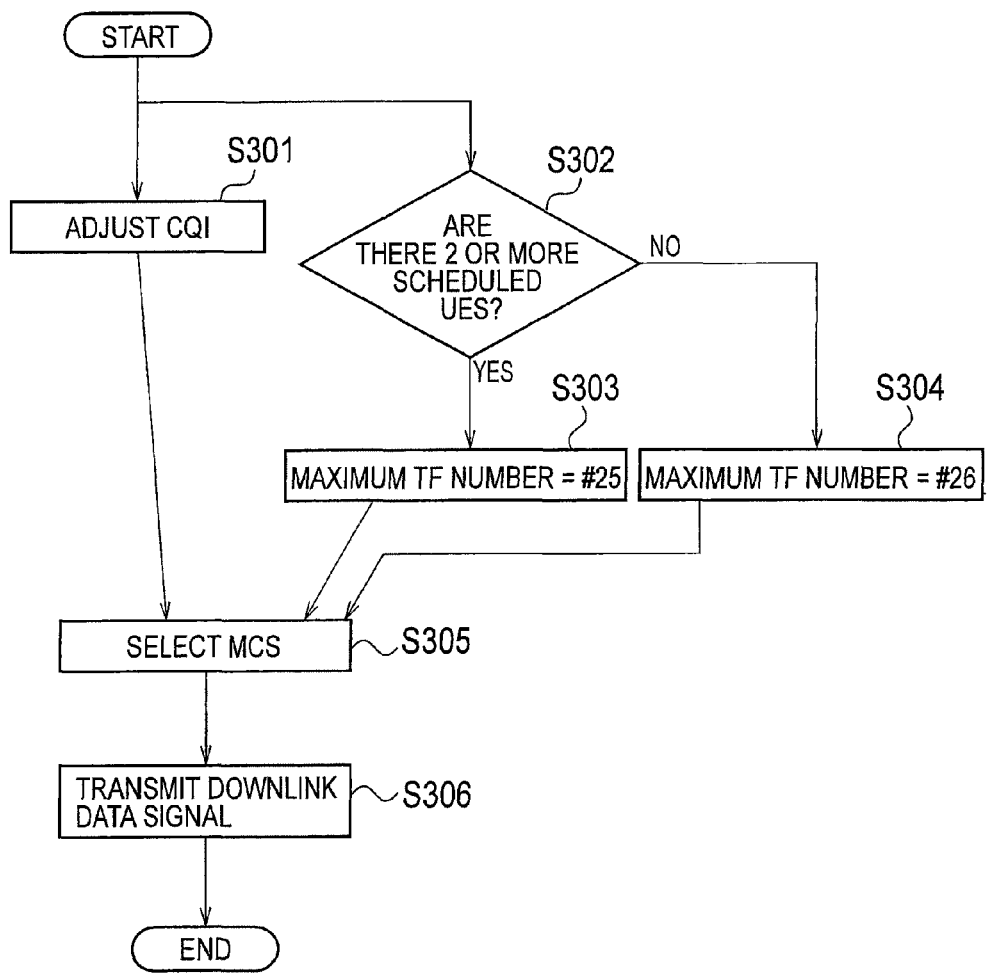
FIG. 8 is a flowchart illustrating an operation of a radio base station according to a second modification of the first embodiment of the present invention.

With reference to FIG. 8, a mobile communication system according to a second modification of the first embodiment of the present invention will be described. Hereinafter, the mobile communication system according to the present second modification will be described while focusing on the difference from the above-mentioned mobile communication system according to the first embodiment.

The MCS selection unit 15 is configured to determine the transmission format corresponding to the selectable maximum transport block size based on the number of mobile stations UE in each subframe (each scheduling unit period).

Here, the number of mobile stations UE, for example, may include, in each subframe, the number of mobile stations UE (that is, "RRC connected UE") in which an RRC connection has been established, the number of mobile stations UE in a Non-DRX state, the number of mobile stations UE with buffers in which data exists, the number of mobile stations UE subject to scheduling calculation, or the number of mobile stations UE to which a shared channel has been determined to be actually assigned.

In addition, the mobile stations UE subject to the scheduling calculation indicate mobile stations UE for which it is probable that a shared channel is assigned in each subframe, and may include both mobile stations UE to which the shared channel has been actually assigned, and mobile stations UE to which the shared channel has not been actually assigned.

Hereinafter, a detailed example, in which the number of mobile stations UE is the number of UE subject to the scheduling calculation, will be described.

For example, when it is determined that a plurality of mobile stations UE have been subject to the scheduling calculation in each subframe (each scheduling unit period), the MCS selection unit 15 may be configured to determine the number of the transmission format corresponding to the selectable maximum transport block size as the "TF #25". When it is determined that only one mobile station UE has been subject to the scheduling calculation in each subframe (each scheduling unit period), the MCS selection unit 15 may be configured to determine the number of the transmission format corresponding to the selectable maximum transport block size as the "TF #26".

In addition, in the above-mentioned example, the MCS selection unit 15 determines the selectable maximum transport block size based on the instantaneous number of mobile stations UE in each subframe (each scheduling unit period). Alternatively, the MCS selection unit 15 may also determine the selectable maximum transport block size based on an average number of mobile stations UE.

For example, the MCS selection unit 15 may also determine the selectable maximum transport block size based on an average value of the number of mobile stations UE for one second, or may further determine the selectable maximum transport block size based on a minimum value or a maximum value of the number of mobile stations UE for one second.

Next, with reference to FIG. 8, an operation of the radio base station eNB according to the present second modification will be described.

As illustrated in FIG. 8, in step S301, the radio base station eNB adjusts the CQI, which is received from the mobile station UE via the PUCCH, based on the transmission acknowledgement result (ACK/NACK/DTX) for the downlink data signal transmitted via the PDSCH.

In step S302, the radio base station eNB determines whether a plurality of mobile stations UE have been subject to the scheduling calculation in each subframe (each scheduling unit period).

When it is determined that the plurality of mobile stations UE have been subject to the scheduling calculation in each subframe (each scheduling unit period), the radio base station eNB determines the number of the transmission format corresponding to the selectable maximum transport block size as the "TF #25" in step S303.

Meanwhile, when it is determined that only one mobile station UE has been subject to the scheduling calculation in each subframe (each scheduling unit period), the radio base station eNB determines the number of the transmission format corresponding to the selectable maximum transport block size as the "TF #26" in step S304.

In step S305, the radio base station eNB selects MCS (a transmission format) based on the adjusted CQI and the determined transmission format corresponding to the selectable maximum transport block size.

In step S306, the radio base station eNB transmits a downlink data signal, which is addressed to a scheduled mobile station UE, by using the selected MCS (transmission format) via the PDSCH.

In a mobile communication system such as the LTE mobile communication system, since a resource is generally shared by a plurality of mobile stations UE, a peak rate is actually important only when only one mobile station UE performs communication in a subframe.

That is, when a plurality of mobile stations UE perform communication in one subframe, a peak rate is not achieved in each mobile station UE.

Consequently, in accordance with the mobile communication system according to the present second modification, when the plurality of mobile stations UE perform communication in one subframe, the selection of a transmission format corresponding to the maximum transport block size, which causes characteristic degradation, is prohibited, resulting in the avoidance of the degradation of throughput, that is, the degradation of cell capacity.

Meanwhile, in accordance with the mobile communication system according to the present second modification, configuration is such that when only one mobile station UE performs communication in one subframe, even in an off-time and a reception environment in which an error necessarily occurs when the TF #26 has been temporarily selected, since it does not have influence on cell capacity and slight characteristic degradation is permissible, the selection of the transmission format corresponding to the maximum transport block size is permitted.

Meanwhile, in accordance with the mobile communication system according to the present second modification, in a reception environment in which no error occurs even when the TF #26 has been selected, it is possible to achieve a peak rate by the selection of the TF #26.

The characteristics of the present embodiment as described above may also be expressed as follows.

A first characteristic of the present embodiment is summarized as a radio base station eNB configured to transmit a downlink data signal to a mobile station UE via PDSCH (a downlink data channel) and including: a CQI reception unit 11 configured to receive CQI (channel quality information) in the PDSCH from the mobile station UE; a CQI adjustment unit 13 configured to adjust the received CQI based on a transmission acknowledgement result (ACK/NACK/DTX) for the downlink data signal transmitted via the PDSCH; a selectable TF number calculation unit 22 configured to calculate a selectable maximum transport block size based on the number of mobile stations UE in each subframe (each scheduling unit period); and an MCS selection unit 15 configured to select a modulation scheme and a coding rate, which are to be applied to each resource blocks in the PDSCH, based on the adjusted CQI and a transmission format corresponding to the selectable maximum transport block size.

In the first characteristic of the present embodiment, the above-mentioned number of mobile stations UE in each subframe includes, in each subframe, the number of mobile stations UE (RRC connected UE) in which an RRC connection has been established, the number of mobile stations UE in a Non-DRX state, the number of mobile stations UE with buffers in which data exists, the number of mobile stations UE subject to scheduling calculation, or the number of mobile stations UE to which a shared channel has been determined to be actually assigned, and the mobile stations UE subject to the scheduling calculation indicate mobile stations UE for which it is probable that a shared channel is assigned in each subframe, and may include both mobile stations UE to which the shared channel has been actually assigned, and mobile stations UE to which the shared channel has not been actually assigned.

A second characteristic of the present embodiment is summarized as a radio base station eNB configured to transmit a downlink data signal to a mobile station UE via PDSCH (a downlink data channel) and including: a CQI reception unit 11 configured to receive CQI (channel quality information) in the PDSCH from the mobile station UE; a CQI adjustment unit 13 configured to adjust the received CQI based on a transmission acknowledgement result (ACK/NACK/DTX) for the downlink data signal transmitted via the PDSCH; and an MCS selection unit 15 configured to acquire a transmission format corresponding to a selectable maximum transport block size as an external setting parameter, and select a modulation scheme and a coding rate, which are to be applied to each resource blocks in the PDSCH, based on the adjusted CQI and the acquired transmission format corresponding to the selectable maximum transport block size.

A third characteristic of the present embodiment is summarized as a radio base station eNB configured to transmit a downlink data signal to a mobile station UE via PDSCH (a downlink data channel) and including: a CQI reception unit 11 configured to receive CQI (channel quality information) in the PDSCH from the mobile station UE; a CQI adjustment unit 13 configured to adjust the received CQI based on a transmission acknowledgement result (ACK/NACK/DTX) for the downlink data signal transmitted via the PDSCH; a PDSCH error rate measurement unit 21 configured to measure BLER (an error rate) in the PDSCH; a selectable TF number calculation unit 22 configured to calculate a transmission format corresponding to a selectable maximum transport block size based on the measured BLER in the PDSCH; and an MCS selection unit 15 configured to select a modulation scheme and a coding rate, which are to be applied to each resource blocks in the PDSCH, based on the adjusted CQI and the calculated transmission format corresponding to the selectable maximum transport block size.

A fourth characteristic of the present embodiment is summarized as a mobile communication method in which a downlink data signal is transmitted from a radio base station eNB to a mobile station UE via PDSCH, the mobile communication method includes: a step in which the mobile station UE transmits CQI in the PDSCH to the radio base station eNB; a step in which the radio base station eNB adjusts the received CQI based on a transmission acknowledgement result (ACK/NACK/DTX) for the downlink data signal transmitted via the PDSCH; a step in which the radio base station eNB calculates a selectable maximum transport block size based on the number of mobile stations UE in each subframe; and a step in which the radio base station eNB selects a modulation scheme and a coding rate, which are to be applied to each resource blocks in the PDSCH, based on the adjusted CQI and a transmission format corresponding to the calculated selectable maximum transport block size.

In the fourth characteristic of the present embodiment, the above-mentioned number of mobile stations UE in each subframe includes, in each subframe, the number of mobile stations UE (RRC connected UE) in which an RRC connection has been established, the number of mobile stations UE in a Non-DRX state, the number of mobile stations UE with buffers in which data exists, the number of mobile stations UE subject to scheduling calculation, or the number of mobile stations UE to which a shared channel has been determined to be actually assigned, and the mobile stations UE subject to the scheduling calculation indicate mobile stations UE for which it is probable that a shared channel is assigned in each subframe, and may include both mobile stations UE to which the shared channel has been actually assigned, and mobile stations UE to which the shared channel has not been actually assigned.

A fifth characteristic of the present embodiment is summarized as a mobile communication method in which a downlink data signal is transmitted from a radio base station eNB to a mobile station UE via PDSCH, the mobile communication method includes: a step in which the mobile station UE transmits CQI in the PDSCH to the radio base station eNB; a step in which the radio base station eNB adjusts the received CQI based on a transmission acknowledgement result (ACK/NACK/DTX) for the downlink data signal transmitted via the PDSCH; a step of inputting a transmission format corresponding to a selectable maximum transport block size to the radio base station eNB as an external setting parameter; and a step in which the radio base station eNB selects a modulation scheme and a coding rate, which are to be applied to each resource blocks in the PDSCH, based on the adjusted CQI and the input transmission format corresponding to the selectable maximum transport block size.

A sixth characteristic of the present embodiment is summarized as a mobile communication method in which a downlink data signal is transmitted from a radio base station eNB to a mobile station UE via PDSCH, the mobile communication method includes: a step in which the mobile station UE transmits CQI in the PDSCH to the radio base station eNB; a step in which the radio base station eNB adjusts the received CQI based on a transmission acknowledgement result (ACK/NACK/DTX) for the downlink data signal transmitted via the PDSCH; a step of measuring BLER in the PDSCH; a step of calculating a transmission format corresponding to a selectable maximum transport block size based on the measured BLER in the PDSCH; and a step in which the radio base station eNB selects a modulation scheme and a coding rate, which are to be applied to each resource blocks in the PDSCH, based on the adjusted CQI and the calculated transmission format corresponding to the selectable maximum transport block size.

(Mobile Communication System According to Second Embodiment)

Figure 9:
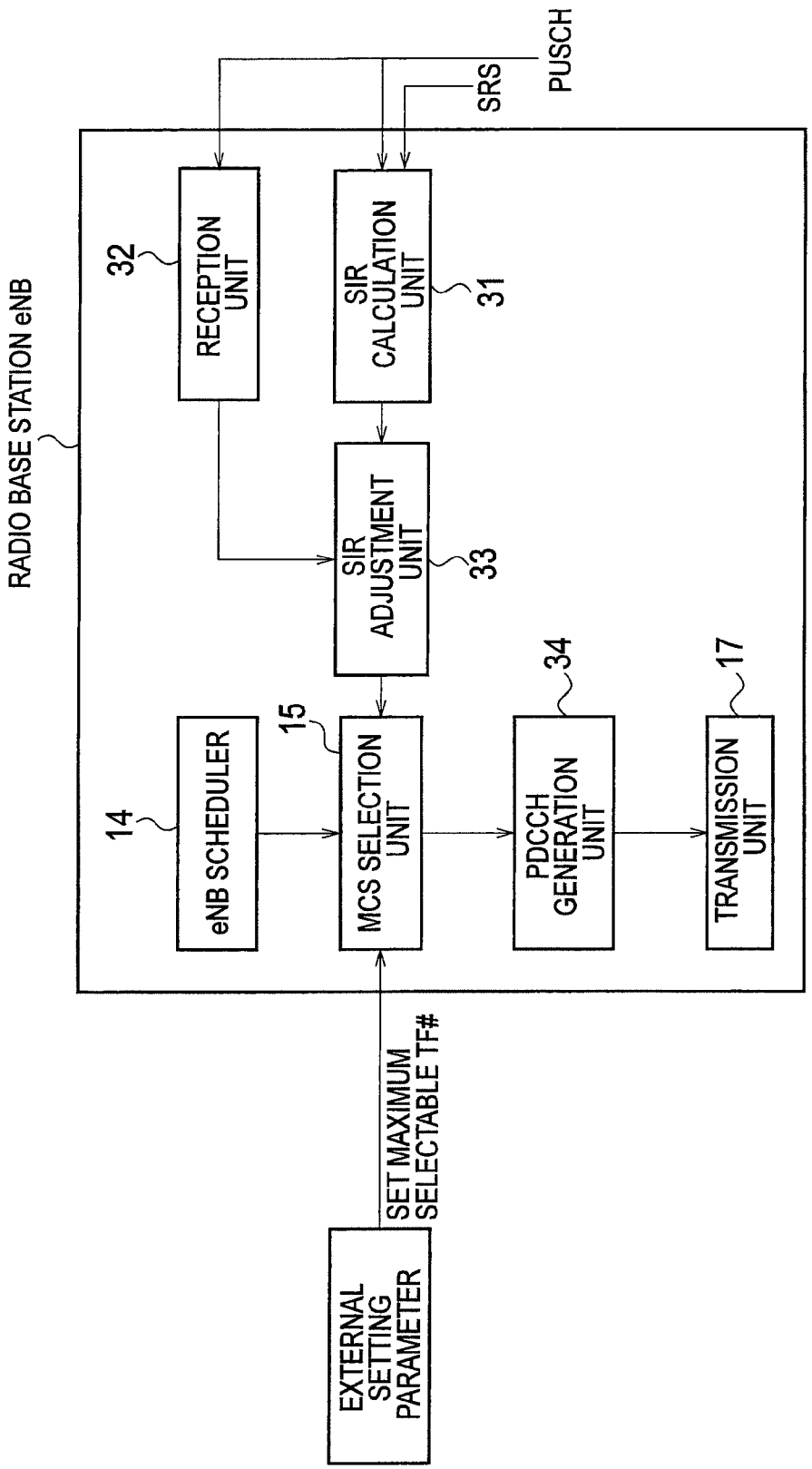
FIG. 9 is a functional block diagram of a radio base station according to a second embodiment of the present invention.
Figure 10:
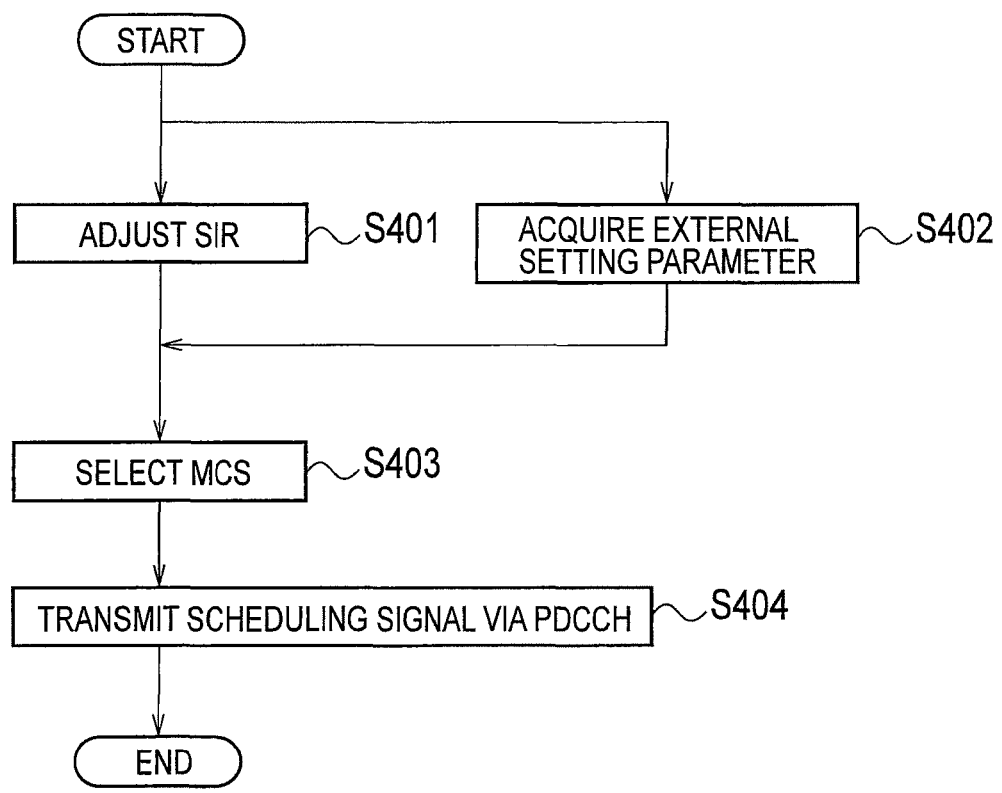
FIG. 10 is a flowchart illustrating an operation of the radio base station according to the second embodiment of the present invention.

With reference to FIG. 9 and FIG. 10, a mobile communication system according to a second embodiment of the present invention will be described. Hereinafter, the mobile communication system according to the present embodiment will be described while focusing on the difference from the above-mentioned mobile communication system according to the first embodiment.

As illustrated in FIG. 9, the radio base station eNB includes an SIR calculation unit 31, a reception unit 32, an SIR adjustment unit 33, an eNB scheduler 14, an MCS selection unit 15, a PDCCH generation unit 34, and a transmission unit 17.

The SIR calculation unit 31 is configured to calculate a quality in PUSCH such as SIR (Signal-to-Interference Ratio) in the PUSCH.

The SIR calculation unit 31 may calculate the quality using a "Sounding Reference Signal (SRS)" or may calculate the quality using a "Demodulation RS" multiplexed to the PUSCH.

The reception unit 32 is configured to receive an uplink data signal transmitted by the mobile station UE via the PUSCH, and receive an uplink control signal transmitted by the mobile station UE via the PUCCH.

The SIR adjustment unit 33 is configured to adjust the calculated SIR in the PUSCH based on a reception result for the uplink data signal transmitted via the PUSCH.

Specifically, the SIR adjustment unit 33 is configured to adjust the SIR calculated by the SIR calculation unit 31 by Equation 3 below.

$$SIR\text{adjust} = SIR\text{measured} + SIR\text{offset} \quad \text{[Equation 3]}$$

In Equation 3 above, the SIRadjust indicates the SIR adjusted by the SIR adjustment unit 33, the SIRmeasured indicates the SIR measured by the SIR calculation unit 31, and the SIRoffset indicates an offset amount given by Equation 4 below.

$$SIR\text{ offset} = \begin{cases} SIR\text{ offset} + \Delta_{adj} \times BLER_{target} & \text{Input} = \text{"ACK"} \\ SIR\text{ offset} - \Delta_{adj} \times (1 - BLER_{target}) & \text{Input} = \text{"NACK"} \\ SIR\text{ offset} & \text{Input} = \text{"DTX"} \end{cases} \quad \text{[Equation 4]}$$

In Equation 4 above, the BLERtarget is a parameter indicating a target BLER (Block Error Rate) in the PUSCH, and the $\Delta$adj is a parameter indicating an SIR adjustment width.

According to Equation 3 and Equation 4, when it is determined that the reception result for the above-mentioned uplink data signal by the reception unit 32 is "ACK", the SIR adjustment unit 33 is configured to increment the SIR offset amount by "$\Delta$adj×BLERtarget".

Furthermore, according to Equation 3 and Equation 4, when it is determined that the reception result for the above-mentioned uplink data signal by the reception unit 32 is "NACK", the SIR adjustment unit 33 is configured to decrement the SIR offset amount by "$\Delta$adj×(1-BLERtarget)".

Furthermore, according to Equation 3 and Equation 4, when the reception unit 32 does not succeed in receiving the above-mentioned uplink control signal (when it is determined that the reception result for the above-mentioned uplink data signal by the reception unit 32 is "DTX"), the SIR adjustment unit 33 is configured to not change the SIR offset amount.

The MCS selection unit 15 is configured to select MCS (a combination of a modulation scheme and a coding rate) to be applied to each resource blocks in the PUSCH, that is, a transmission format, based on the SIR adjusted by the SIR adjustment unit 33 and transmission formats (that is, selectable maximum TFs) corresponding to a selectable maximum transport block size.

For example, the MCS selection unit 15 may be configured to select a transmission format, which corresponds to the SIR adjusted by the SIR adjustment unit 33, from the transmission formats corresponding to the selectable maximum transport block size.

Here, the MCS selection unit 15 is configured to acquire the number (that is, a selectable maximum TF #) of the transmission format corresponding to the selectable maximum transport block size, as an external setting parameter.

The PDCCH generation unit 34 is configured to generate a downlink control signal to be transmitted via the PDCCH.

Here, the PDCCH generation unit 34 is configured to include the MCS (the transmission format) selected by the MCS selection unit 15 into the downlink control signal, which is to be transmitted via the PDCCH, as a scheduling signal.

The transmission unit 17 is configured to transmit the downlink control signal (the scheduling signal) generated by the PDCCH generation unit 34 to a scheduled mobile station UE via the PDCCH.

Next, with reference to FIG. 10, an operation of the radio base station eNB according to the present embodiment will be described.

As illustrated in FIG. 10, in step S401, the radio base station eNB calculates SIR in the PUSCH using the Demodulation RS or the Souding RS, and adjusts the calculated SIR in the PUSCH based on the reception result (ACK/NACK/DTX) for the uplink data signal transmitted via the PUSCH.

In step S402, the radio base station eNB acquires the number (that is, the selectable maximum TF #) of the transmission format corresponding to the selectable maximum transport block size, as the external setting parameter.

In step S403, the radio base station eNB selects MCS (a transmission format), which is to be applied to resource blocks in the PUSCH, based on the adjusted SIR and the transmission format corresponding to the selectable maximum transport block size.

In step S404, the radio base station eNB transmits a downlink control signal, which includes the selected MCS (transmission format) as the scheduling signal, to a scheduled mobile station UE via the PDCCH.

In accordance with the mobile communication system according to the present embodiment, through simple control with a small development impact, it is possible to avoid the degradation of throughput characteristics due to the use of MCS (a transmission format) with a high coding rate in which reception characteristics are degraded in a specific radio environment.

First Modification

Figure 11:
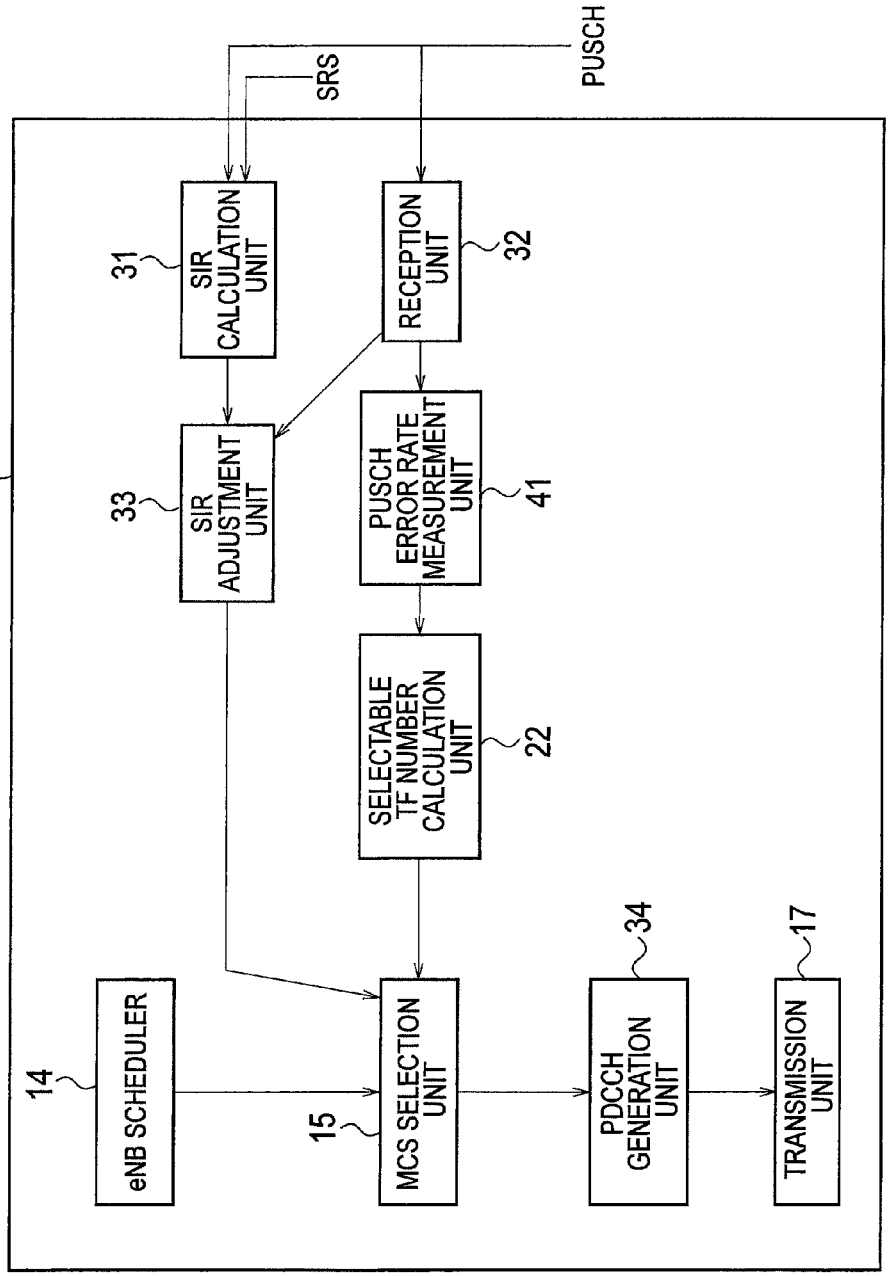
FIG. 11 is a functional block diagram of a radio base station according to a first modification of the second embodiment of the present invention.
Figure 12:
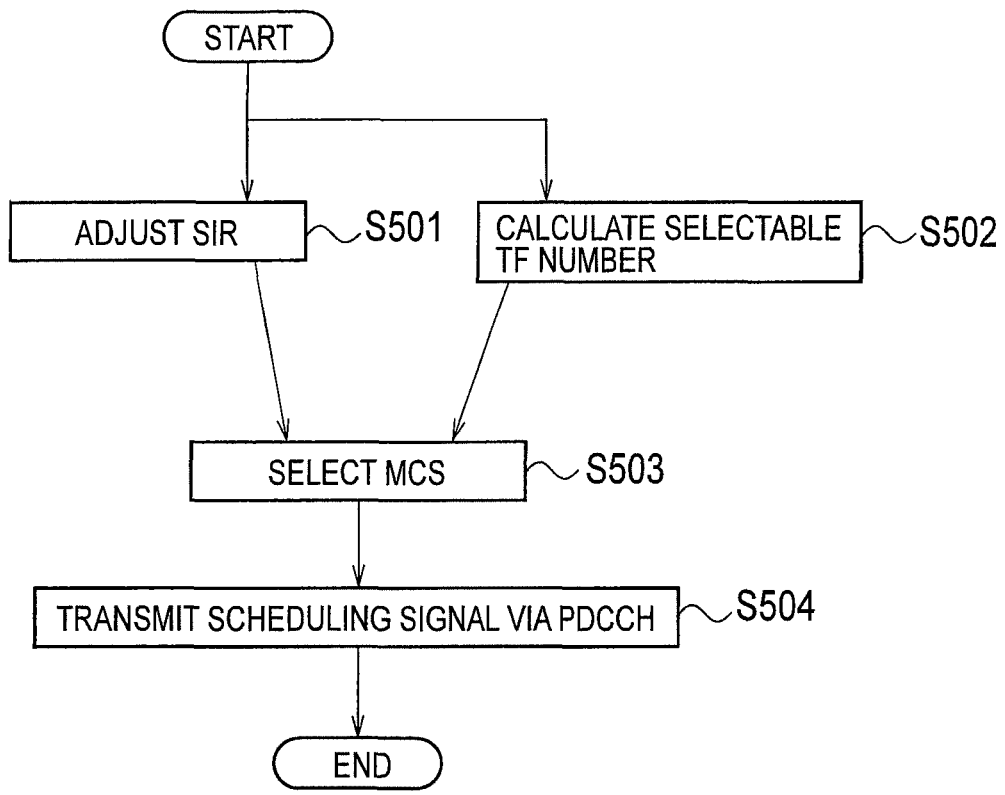
FIG. 12 is flowchart illustrating an operation of the radio base station according to the first modification of the second embodiment of the present invention.

With reference to FIG. 11 and FIG. 12, a mobile communication system according to a first modification of the second embodiment of the present invention will be described. Hereinafter, the mobile communication system according to the present first modification will be described while focusing on the difference from the above-mentioned mobile communication system according to the second embodiment.

As illustrated in FIG. 11, a radio base station eNB according to the present first modification includes a PUSCH error rate measurement unit 41 and a selectable TF number calculation unit 22, in addition to the configuration of the radio base station eNB according to the above-mentioned first embodiment.

The PUSCH error rate measurement unit 41 is configured to measure an index (a metric value) indicating reception quality in the PUSCH, such as BLER (an error rate) in the PUSCH, based on the reception result (ACK/NACK/DTX) for the above-mentioned uplink data signal by the reception unit 32.

For example, the PUSCH error rate measurement unit 41 may be configured to measure, as the metric value, BLER for upper Z MCSs within a measurement interval Y second in each measurement cycle X second.

The selectable TF number calculation unit 22 is configured to calculate the transmission format (that is, the selectable maximum TF) corresponding to the selectable maximum transport block size, based on the metric value, such as the BLER in the PUSCH, which has been measured by the PUSCH error rate measurement unit 41.

For example, the selectable TF number calculation unit 22 may determine a transmission format (for example, a transmission format specified by the TF #26), in which the above-mentioned metric value is equal to or more than a predetermined threshold value, to be non-selectable.

Here, the selectable TF number calculation unit 22 may determine the transmission format, in which the above-mentioned metric value is equal to or more than the predetermined threshold value, to be non-selectable until a next measurement interval ends.

The MCS selection unit 15 is configured to select MCS (a combination of a modulation scheme and a coding rate) to be applied to each resource blocks in the PUSCH, that is, a transmission format, based on the SIR adjusted by the SIR adjustment unit 33 and a transmission format (that is, a selectable maximum TF) corresponding to the selectable maximum transport block size calculated by the selectable TF number calculation unit 22.

Next, with reference to FIG. 12, an operation of the radio base station eNB according to the present first modification will be described.

As illustrated in FIG. 12, in step S501, the radio base station eNB calculates SIR in the PUSCH, and adjusts the calculated SIR in the PUSCH based on the reception result (ACK/NACK/DTX) for the uplink data signal transmitted via the PUSCH.

In step S502, the radio base station eNB calculates the number (that is, the selectable maximum TF #) of the transmission format corresponding to the selectable maximum transport block size based on the measured BLER in the PUSCH.

In step S503, the radio base station eNB selects MCS (a transmission format), which is to be applied to resource blocks in the PUSCH, based on the adjusted SIR and the calculated transmission format corresponding to the selectable maximum transport block size.

In step S504, the radio base station eNB transmits the downlink control signal, which includes the selected MCS (the transmission format) as the scheduling signal, to a scheduled mobile station UE via the PDCCH.

In accordance with the mobile communication system according to the present first modification, it is possible to avoid the use of MCS in which communication is not possible with respect to a mobile station UE in an environment with bad reception quality or a radio base station eNB with bad decoding performance, resulting in the avoidance of the degradation of throughput characteristics.

Second Modification

Figure 13:
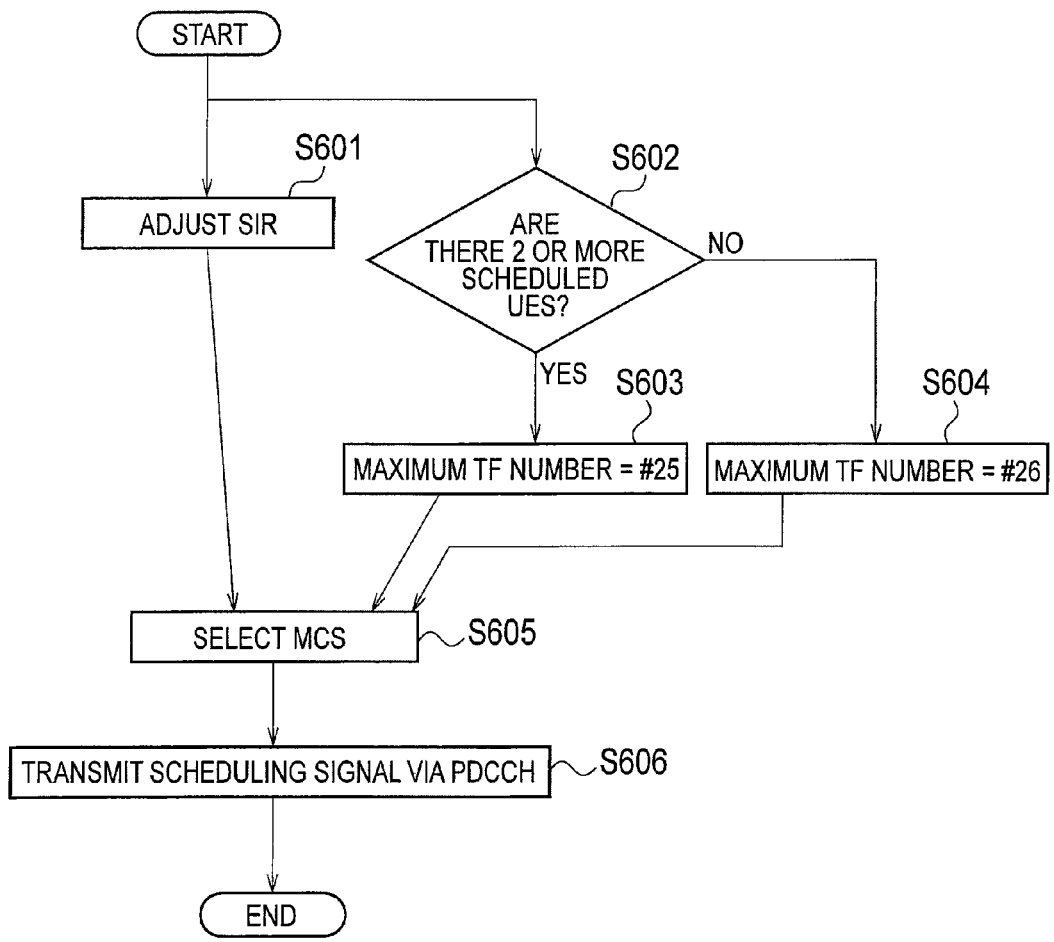
FIG. 13 is a flowchart illustrating an operation of a radio base station according to a second modification of the second embodiment of the present invention.

With reference to FIG. 13, a mobile communication system according to a second modification of the second embodiment of the present invention will be described. Hereinafter, the mobile communication system according to the present second modification will be described while focusing on the difference from the above-mentioned mobile communication system according to the second embodiment.

The MCS selection unit 15 is configured to determine the transmission format corresponding to the selectable maximum transport block size based on the number of mobile stations UE in each subframe (each scheduling unit period).

Here, the number of mobile stations UE, for example, may include, in each subframe, the number of mobile stations UE (that is, "RRC connected UE") in which an RRC connection has been established, the number of mobile stations UE in a Non-DRX state, the number of mobile stations UE with buffers in which data exists, the number of mobile stations UE subject to scheduling calculation, or the number of mobile stations UE to which a shared channel has been determined to be actually assigned.

In addition, the mobile stations UE subject to the scheduling calculation indicate mobile stations UE for which it is probable that a shared channel is assigned in each subframe, and may include both mobile stations UE to which the shared channel has been actually assigned, and mobile stations UE to which the shared channel has not been actually assigned.

Hereinafter, a detailed example, in which the number of mobile stations UE is the number of UE subject to the scheduling calculation, will be described.

For example, when it is determined that a plurality of mobile stations UE have been subject to the scheduling calculation in each subframe (each scheduling unit period), the MCS selection unit 15 may be configured to determine the number of the transmission format corresponding to the selectable maximum transport block size as the "TF #25". When it is determined that only one mobile station UE has been subject to the scheduling calculation in each subframe (each scheduling unit period), the MCS selection unit 15 may be configured to determine the number of the transmission format corresponding to the selectable maximum transport block size as the "TF #26".

In addition, in the above-mentioned example, the MCS selection unit 15 determines the selectable maximum transport block size based on the instantaneous number of mobile stations in each subframe (each scheduling unit period). Alternatively, the MCS selection unit 15 may also determine the selectable maximum transport block size based on an average number of mobile stations.

For example, the MCS selection unit 15 may also determine the selectable maximum transport block size based on an average value of the number of mobile stations UE for one second.

Otherwise, the MCS selection unit 15 may further determine the selectable maximum transport block size based on a minimum value or a maximum value of the number of mobile stations for one second.

Next, with reference to FIG. 13, an operation of the radio base station eNB according to the present second modification will be described.

As illustrated in FIG. 13, in step S601, the radio base station eNB calculates SIR in the PUSCH, and adjusts the calculated SIR in the PUSCH based on the reception result (ACK/NACK/DTX) for the uplink data signal transmitted via the PUSCH.

In step S602, the radio base station eNB determines whether a plurality of mobile stations UE have been subject to the scheduling calculation in each subframe (each scheduling unit period).

When it is determined that the plurality of mobile stations UE have been subject to the scheduling calculation in each subframe (each scheduling unit period), the radio base station eNB determines the number of the transmission format corresponding to the selectable maximum transport block size as the "TF #25" in step S603.

Meanwhile, when it is determined that only one mobile station UE has been subject to the scheduling calculation in each subframe (each scheduling unit period), the radio base station eNB determines the number of the transmission format corresponding to the selectable maximum transport block size as the "TF #26" in step S604.

In step S605, the radio base station eNB selects MCS (a transmission format), which is to be applied to resource blocks in the PUSCH, based on the adjusted SIR and the determined transmission format corresponding to the selectable maximum transport block size.

In step S606, the radio base station eNB transmits the downlink control signal, which includes the selected MCS (transmission format) as the scheduling signal, to a scheduled mobile station UE via the PDCCH.

In accordance with the mobile communication system according to the present second modification, when the plurality of mobile stations UE perform communication in one subframe, the selection of a transmission format corresponding to the maximum transport block size, which causes characteristic degradation, is prohibited, resulting in the avoidance of the degradation of throughput, that is, the degradation of cell capacity.

Meanwhile, in accordance with the mobile communication system according to the present second modification, configuration is such that when only one mobile station UE performs communication in one subframe, even in an off-time and a reception environment in which an error necessarily occurs when the TF #26 has been temporarily selected, since it does not have influence on cell capacity and slight characteristic degradation is permissible, the selection of the transmission format corresponding to the maximum transport block size is permitted.

Meanwhile, in accordance with the mobile communication system according to the present second modification, in a reception environment in which no error occurs even when the TF #26 has been selected, it is possible to achieve a peak rate by the selection of the TF #26.

The characteristics of the present embodiment as described above may also be expressed as follows.

A first characteristic of the present embodiment is summarized as a radio base station eNB configured to receive an uplink data signal from a mobile station UE via PUSCH (an uplink data channel) and including: an SIR calculation unit 31 configured to calculate SIR (quality) in the PUSCH; an SIR adjustment unit 33 configured to adjust the calculated SIR in the PUSCH based on a reception result for the uplink data signal transmitted via the PUSCH; a selectable TF number calculation unit 22 configured to calculate a selectable maximum transport block size based on the number of mobile stations UE in each subframe (each scheduling unit period); and an MCS selection unit 15 configured to select a modulation scheme and a coding rate, which are to be applied to each resource blocks in the PUSCH, based on the adjusted SIR and a transmission format corresponding to the calculated selectable maximum transport block size.

In the first characteristic of the present embodiment, the above-mentioned number of mobile stations UE in each subframe includes, in each subframe, the number of mobile stations UE (RRC connected UE) in which an RRC connection has been established, the number of mobile stations UE in a Non-DRX state, the number of mobile stations with buffers in which data exists, the number of mobile stations UE subject to scheduling calculation, or the number of mobile stations UE to which a shared channel has been determined to be actually assigned, and the mobile stations UE subject to the scheduling calculation indicate mobile stations UE for which it is probable that a shared channel is assigned in each subframe, and may include both mobile stations UE to which the shared channel has been actually assigned, and mobile stations UE to which the shared channel has not been actually assigned.

A second characteristic of the present embodiment is summarized as a radio base station eNB configured to receive an uplink data signal from a mobile station UE via PUSCH (an uplink data channel) and including: an SIR calculation unit 31 configured to calculate SIR (quality) in the PUSCH; an SIR adjustment unit 33 configured to adjust the calculated SIR in the PUSCH based on a reception result for the uplink data signal transmitted via the PUSCH; and an MCS selection unit 15 configured to acquire a transmission format corresponding to a selectable maximum transport block size as an external setting parameter, and select a modulation scheme and a coding rate, which are to be applied to each resource blocks in the PUSCH, based on the adjusted SIR and the acquired transmission format corresponding to the selectable maximum transport block size.

A third characteristic of the present embodiment is summarized as a radio base station eNB configured to receive an uplink data signal from a mobile station UE via PUSCH (an uplink data channel) and including: an SIR calculation unit 31 configured to calculate SIR (quality) in the PUSCH; an SIR adjustment unit 33 configured to adjust the calculated SIR in the PUSCH based on a reception result for the uplink data signal transmitted via the PUSCH; a PUSCH error rate measurement unit 41 configured to measure BLER (an error rate) in the PUSCH; a selectable TF number calculation unit 22 configured to calculate a transmission format corresponding to a selectable maximum transport block size based on the measured BLER in the PUSCH; and an MCS selection unit 15 configured to select a modulation scheme and a coding rate, which are to be applied to each resource blocks in the PUSCH, based on the adjusted SIR and the calculated transmission format corresponding to the selectable maximum transport block size.

A fourth characteristic of the present embodiment is summarized as a mobile communication method in which an uplink data signal is transmitted from a mobile station UE to a radio base station eNB via PUSCH, the mobile communication method includes: a step in which the radio base station eNB calculates SIR in the PUSCH; a step in which the radio base station eNB adjusts the calculated SIR in the PUSCH based on a reception result for the uplink data signal transmitted via the PUSCH; a step in which the radio base station eNB calculates a selectable maximum transport block size based on the number of mobile stations UE in each subframe; and a step in which the radio base station eNB selects a modulation scheme and a coding rate, which are to be applied to each resource blocks in the PUSCH, based on the adjusted SIR and a transmission format corresponding to the calculated selectable maximum transport block size.

In the fourth characteristic of the present embodiment, the above-mentioned number of mobile stations UE in each subframe includes, in each subframe, the number of mobile stations UE (RRC connected UE) in which an RRC connection has been established, the number of mobile stations UE in a Non-DRX state, the number of mobile stations with buffers in which data exists, the number of mobile stations UE subject to scheduling calculation, or the number of mobile stations UE to which a shared channel has been determined to be actually assigned, and the mobile stations UE subject to the scheduling calculation indicate mobile stations UE for which it is probable that a shared channel is assigned in each subframe, and may include both mobile stations UE to which the shared channel has been actually assigned, and mobile stations UE to which the shared channel has not been actually assigned.

A fifth characteristic of the present embodiment is summarized as a mobile communication method in which an uplink data signal is transmitted from a mobile station UE to a radio base station eNB via PUSCH, the mobile communication method includes: a step in which the radio base station eNB calculates SIR in the PUSCH; a step in which the radio base station eNB adjusts the calculated SIR in the PUSCH based on a reception result for the uplink data signal transmitted via the PUSCH; a step of inputting a transmission format corresponding to a selectable maximum transport block size to the radio base station eNB as an external setting parameter; and a step in which the radio base station eNB selects a modulation scheme and a coding rate, which are to be applied to each resource blocks in the PUSCH, based on the adjusted SIR and the input transmission format corresponding to the selectable maximum transport block size.

A sixth characteristic of the present embodiment is summarized as a mobile communication method in which an uplink data signal is transmitted from a mobile station UE to a radio base station eNB via PUSCH, the mobile communication method includes: a step in which the radio base station eNB calculates SIR in the PUSCH; a step in which the radio base station eNB adjusts the calculated SIR in the PUSCH based on a reception result for the uplink data signal transmitted via the PUSCH; a step of measuring BLER in the PUSCH; a step of calculating a transmission format corresponding to a selectable maximum transport block size based on the measured BLER in the PUSCH; and a step in which the radio base station eNB selects a modulation scheme and a coding rate, which are to be applied to each resource blocks in the PUSCH, based on the adjusted SIR and the calculated transmission format corresponding to the selectable maximum transport block size.

In addition, the operation of the above-mentioned radio base station eNB or mobile station UE may be implemented by hardware, may also be implemented by a software module executed by a processor, or may further be implemented by the combination of the both.

The software module may be arranged in a storage medium of an arbitrary format such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

Such a storage medium is connected to the processor so that the processor can write and read information into and from the storage medium. Such a storage medium may also be accumulated in the processor. Such storage medium and processor may be arranged in an ASIC. Such ASIC may be arranged in the radio base station eNB or the mobile station UE. As a discrete component, such storage medium and processor may be arranged in the radio base station eNB or the mobile station UE.

Thus, the present invention has been specifically explained by using the above-mentioned embodiments; however, it is obvious that for persons skilled in the art, the present invention is not limited to the embodiments explained herein. The present invention can be implemented as corrected and modified modes without departing from the gist and the scope of the present invention defined by the claims. Therefore, the description of the specification is intended for explaining the example only and does not impose any limited meaning to the present invention.

INDUSTRIAL APPLICABILITY

As described above, according to the present invention, it is possible to provide a radio base station and a mobile communication method, capable of realizing a high speed peak rate without degrading throughput characteristics.

The invention claimed is:

1. A radio base station configured to transmit a downlink data signal to a mobile station via a downlink data channel, the radio base station comprising:
a channel quality information reception unit configured to receive channel quality information in the downlink data channel from the mobile station;
a channel quality information adjustment unit configured to adjust the received channel quality information based on a transmission acknowledgement result for the downlink data signal transmitted via the downlink data channel;
a selectable transport format number calculation unit configured to calculate a selectable maximum transport block size based on a number of mobile stations in each scheduling unit period; and
a selection unit configured to select a modulation scheme and a coding rate, which are to be applied to each resource blocks in the downlink data channel, based on the adjusted channel quality information and a transmission format corresponding to the calculated selectable maximum transport block size.

2. The radio base station according to claim 1, wherein
the number of mobile stations includes, in each scheduling unit period, the number of mobile stations in which an RRC connection has been established, the number of mobile stations in a Non-DRX state, the number of mobile stations with buffers in which data exists, the number of mobile stations subject to scheduling calculation, or the number of mobile stations to which a shared channel has been determined to be actually assigned, and
the mobile stations subject to the scheduling calculation indicate mobile stations for which it is probable that a shared channel is assigned in each scheduling unit period, and include both mobile stations to which the shared channel has been actually assigned, and mobile stations to which the shared channel has not been actually assigned.

3. A radio base station configured to transmit a downlink data signal to a mobile station via a downlink data channel, the radio base station comprising:
a channel quality information reception unit configured to receive channel quality information in the downlink data channel from the mobile station;
a channel quality information adjustment unit configured to adjust the received channel quality information based on a transmission acknowledgement result for the downlink data signal transmitted via the downlink data channel;
a selection unit configured to acquire a transmission format corresponding to a selectable maximum transport block size as an external setting parameter, and select a modulation scheme and a coding rate, which are to be applied to each resource blocks in the downlink data channel, based on the adjusted channel quality information and the acquired transmission format corresponding to the selectable maximum transport block size.

4. A radio base station configured to transmit a downlink data signal to a mobile station via a downlink data channel, the radio base station comprising:
a channel quality information reception unit configured to receive channel quality information in the downlink data channel from the mobile station;
a channel quality information adjustment unit configured to adjust the received channel quality information based on a transmission acknowledgement result for the downlink data signal transmitted via the downlink data channel;
a measurement unit configured to measure an error rate in the downlink data channel;
a calculation unit configured to calculate a transmission format corresponding to a selectable maximum transport block size based on the measured error rate in the downlink data channel; and a selection unit configured to select a modulation scheme and a coding rate, which are to be applied to each resource blocks in the downlink data channel, based on the adjusted channel quality information and the calculated transmission format corresponding to the selectable maximum transport block size.

5. A mobile communication method, in which a downlink data signal is transmitted from a radio base station to a mobile station via a downlink data channel, the mobile communication method comprising:
a step in which the mobile station transmits channel quality information in the downlink data channel to the radio base station;
a step in which the radio base station adjusts the received channel quality information based on a transmission acknowledgement result for the downlink data signal transmitted via the downlink data channel;
a step in which the radio base station calculates a selectable maximum transport block size based on a number of mobile stations in each scheduling unit period; and
a step in which the radio base station selects a modulation scheme and a coding rate, which are to be applied to each resource blocks in the downlink data channel, based on the adjusted channel quality information and a transmission format corresponding to the calculated selectable maximum transport block size.

6. The mobile communication method according to claim 5, wherein
the number of mobile stations includes, in each scheduling unit period, the number of mobile stations in which an RRC connection has been established, the number of mobile stations in a Non-DRX state, the number of mobile stations with buffers in which data exists, the number of mobile stations subject to scheduling calculation, or the number of mobile stations to which a shared channel has been determined to be actually assigned, and
the mobile stations subject to the scheduling calculation indicate mobile stations for which it is probable that a shared channel is assigned in each scheduling unit period, and include both mobile stations to which the shared channel has been actually assigned, and mobile stations to which the shared channel has not been actually assigned.

7. A mobile communication method, in which a downlink data signal is transmitted from a radio base station to a mobile station via a downlink data channel, the mobile communication method comprising:
a step in which the mobile station transmits channel quality information in the downlink data channel to the radio base station;
a step in which the radio base station adjusts the received channel quality information based on a transmission acknowledgement result for the downlink data signal transmitted via the downlink data channel;
a step of inputting a transmission format corresponding to a selectable maximum transport block size to the radio base station as an external setting parameter; and
a step in which the radio base station selects a modulation scheme and a coding rate, which are to be applied to each resource blocks in the downlink data channel, based on the adjusted channel quality information and the input transmission format corresponding to the selectable maximum transport block size.

8. A mobile communication method, in which a downlink data signal is transmitted from a radio base station to a mobile station via a downlink data channel, the mobile communication method comprising:
- a step in which the mobile station transmits channel quality information in the downlink data channel to the radio base station;
- a step in which the radio base station adjusts the received channel quality information based on a transmission acknowledgement result for the downlink data signal transmitted via the downlink data channel;
- a step of measuring an error rate in the downlink data channel;
- a step of calculating a transmission format corresponding to a selectable maximum transport block size based on the measured error rate in the downlink data channel; and
- a step in which the radio base station selects a modulation scheme and a coding rate, which are to be applied to each resource blocks in the downlink data channel, based on the adjusted channel quality information and the calculated transmission format corresponding to the selectable maximum transport block size.

9. A radio base station configured to receive an uplink data signal from a mobile station via an uplink data channel, the radio base station comprising:
- a quality calculation unit configured to calculate a quality in the uplink data channel;
- a quality adjustment unit configured to adjust the calculated quality in the uplink data channel based on a reception result for the uplink data signal transmitted via the uplink data channel;
- a selectable transport format number calculation unit configured to calculate a selectable maximum transport block size based on a number of mobile stations in each scheduling unit period; and
- a selection unit configured to select a modulation scheme and a coding rate, which are to be applied to each resource blocks in the uplink data channel, based on the adjusted quality in the uplink data channel and a transmission format corresponding to the determined selectable maximum transport block size.

10. The radio base station according to claim 9, wherein the number of mobile stations includes, in each scheduling unit period, the number of mobile stations in which an RRC connection has been established, the number of mobile stations in a Non-DRX state, the number of mobile stations with buffers in which data exists, the number of mobile stations subject to scheduling calculation, or the number of mobile stations to which a shared channel has been determined to be actually assigned, and
the mobile stations subject to the scheduling calculation indicate mobile stations for which it is probable that a shared channel is assigned in each scheduling unit period, and include both mobile stations to which the shared channel has been actually assigned, and mobile stations to which the shared channel has not been actually assigned.

11. A radio base station configured to receive an uplink data signal from a mobile station via an uplink data channel, the radio base station comprising:
- a quality calculation unit configured to calculate a quality in the uplink data channel;
- a quality adjustment unit configured to adjust the calculated quality in the uplink data channel based on a reception result for the uplink data signal transmitted via the uplink data channel;
- a selection unit configured to acquire a transmission format corresponding to a selectable maximum transport block size as an external setting parameter, and select a modulation scheme and a coding rate, which are to be applied to each resource blocks in the uplink data channel, based on the adjusted quality in the uplink data channel and the acquired transmission format corresponding to the selectable maximum transport block size.

12. A radio base station configured to receive an uplink data signal from a mobile station via an uplink data channel, the radio base station comprising:
- a quality calculation unit configured to calculate a quality in the uplink data channel;
- a quality adjustment unit configured to adjust the calculated quality in the uplink data channel based on a reception result for the uplink data signal transmitted via the uplink data channel;
- a measurement unit configured to measure an error rate in the uplink data channel;
- a calculation unit configured to calculate a transmission format corresponding to a selectable maximum transport block size based on the measured error rate in the uplink data channel; and
- a selection unit configured to select a modulation scheme and a coding rate, which are to be applied to each resource blocks in the uplink data channel, based on the adjusted quality in the uplink data channel and the calculated transmission format corresponding to the selectable maximum transport block size.

13. A mobile communication method, in which an uplink data signal is transmitted from a mobile station to a radio base station via an uplink data channel, the mobile communication method comprising:
- a step of calculating a quality in the uplink data channel,
- a step in which the radio base station adjusts the calculated quality in the uplink data channel based on a reception result for the uplink data signal transmitted via the uplink data channel,
- a step in which the radio base station calculates a selectable maximum transport block size based on a number of mobile stations in each scheduling unit period; and
- a step in which the radio base station selects a modulation scheme and a coding rate, which are to be applied to each resource blocks in the uplink data channel, based on the adjusted quality in the uplink data channel and a transmission format corresponding to the calculated selectable maximum transport block size.

14. The mobile communication method according to claim 13, wherein
the number of mobile stations includes, in each scheduling unit period, the number of mobile stations in which an RRC connection has been established, the number of mobile stations in a Non-DRX state, the number of mobile stations with buffers in which data exists, the number of mobile stations subject to scheduling calculation, or the number of mobile stations to which a shared channel has been determined to be actually assigned, and
the mobile stations subject to the scheduling calculation indicate mobile stations for which it is probable that a shared channel is assigned in each scheduling unit period, and include both mobile stations to which the shared channel has been actually assigned, and mobile stations to which the shared channel has not been actually assigned.

15. A mobile communication method, in which an uplink data signal is transmitted from a mobile station to a radio base station via an uplink data channel, the mobile communication method comprising:

a step of calculating a quality in the uplink data channel, a step in which the radio base station adjusts the calculated quality in the uplink data channel based on a reception result for the uplink data signal transmitted via the uplink data channel, a step of inputting a transmission format corresponding to a selectable maximum transport block size to the radio base station as an external setting parameter; and a step in which the radio base station selects a modulation scheme and a coding rate, which are to be applied to each resource blocks in the uplink data channel, based on the adjusted quality in the uplink data channel and the input transmission format corresponding to the selectable maximum transport block size.

16. A mobile communication method, in which an uplink data signal is transmitted from a mobile station to a radio base station via an uplink data channel, the mobile communication method comprising:

a step of calculating a quality in the uplink data channel, a step in which the radio base station adjusts the calculated quality in the uplink data channel based on a reception result for the uplink data signal transmitted via the uplink data channel, a step of measuring an error rate in the uplink data channel;

a step of calculating a transmission format corresponding to a selectable maximum transport block size based on the measured error rate in the uplink data channel; and a step in which the radio base station selects a modulation scheme and a coding rate, which are to be applied to each resource blocks in the uplink data channel, based on the adjusted quality in the uplink data channel and the calculated transmission format corresponding to the selectable maximum transport block size.

* * * * *